(12) United States Patent
Agarwal et al.

(10) Patent No.: US 12,353,902 B2
(45) Date of Patent: Jul. 8, 2025

(54) CONFIDENTIAL COMPUTE ARCHITECTURE INTEGRATED WITH DIRECT SWAP CACHING

(71) Applicant: Microsoft Technology Licensing, LLC, Redmond, WA (US)

(72) Inventors: Ishwar Agarwal, Redmond, WA (US); Bryan David Kelly, Carnation, WA (US); Vishal Soni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 569 days.

(21) Appl. No.: 17/716,823

(22) Filed: Apr. 8, 2022

(65) Prior Publication Data

US 2023/0325225 A1     Oct. 12, 2023

(51) Int. Cl.
    *G06F 9/455*     (2018.01)
(52) U.S. Cl.
    CPC .. *G06F 9/45558* (2013.01); *G06F 2009/4557* (2013.01); *G06F 2009/45579* (2013.01); *G06F 2009/45583* (2013.01)
(58) Field of Classification Search
    CPC ......... G06F 9/45558; G06F 2009/4557; G06F 2009/45579; G06F 2009/45583
    See application file for complete search history.

(56) References Cited

U.S. PATENT DOCUMENTS

| 7,624,240 | B1 * | 11/2009 | Colbert | G06F 9/45558 711/159 |
| 7,925,850 | B1 * | 4/2011 | Waldspurger | G06F 9/4856 711/162 |
| 9,418,220 | B1 | 8/2016 | Mckee et al. | |
| 2012/0166891 | A1 | 6/2012 | Dahlen et al. | |
| 2016/0239430 | A1 | 8/2016 | Tsirkin et al. | |
| 2017/0344298 | A1 * | 11/2017 | Shih | G06F 12/12 |
| 2018/0285140 | A1 * | 10/2018 | Kaplan | G06F 9/45558 |
| 2018/0341768 | A1 | 11/2018 | Marshall et al. | |
| 2020/0371692 | A1 | 11/2020 | Van Doorn et al. | |

(Continued)

OTHER PUBLICATIONS

"International Search Report and Written Opinion Issued in PCT Application No. PCT/US23/011567", Mailed Date: May 4, 2023, 13 Pages.

(Continued)

*Primary Examiner* — Jacob D Dascomb
(74) *Attorney, Agent, or Firm* — Ranjeev Singh; Singh Law, PLLC

(57) ABSTRACT

Systems and methods for a confidential compute architecture integrated with direct swap caching are described. An example method for managing a near memory and a far memory includes, in response to determining that the far memory contains an encrypted version of a first block of data, retrieving from the far memory the encrypted version of the first block of data, decrypting the first block of data using a first key for exclusive use by a first virtual machine associated with the system, and providing a decrypted version of the first block of data to the requestor. The method further includes swapping out a second block of data having an address conflict with the first block of data from the near memory to the far memory, where the second block of data is encrypted using a second key for exclusive use by a second virtual machine associated with the system.

20 Claims, 9 Drawing Sheets

---

710 — RECEIVING A REQUEST FROM A REQUESTOR TO READ A FIRST BLOCK OF DATA THAT IS EITHER STORED IN A NEAR MEMORY OR IN A FAR MEMORY, WHERE THE READ REQUEST INCLUDES A FIRST KEY ASSOCIATED WITH A FIRST VIRTUAL MACHINE CORRESPONDING TO A SYSTEM, AND WHERE THE FIRST KEY IS FOR EXCLUSIVE USE BY THE FIRST VIRTUAL MACHINE

730 — IN RESPONSE TO DETERMINING THAT THE FAR MEMORY CONTAINS AN ENCRYPTED VERSION OF THE FIRST BLOCK OF DATA: (1) RETRIEVING FROM THE FAR MEMORY THE ENCRYPTED VERSION OF THE FIRST BLOCK OF DATA, DECRYPTING THE FIRST BLOCK OF DATA USING THE FIRST KEY, AND PROVIDING A DECRYPTED VERSION OF THE FIRST BLOCK OF DATA TO THE REQUESTOR, AND (2) SWAPPING OUT A SECOND BLOCK OF DATA HAVING AN ADDRESS CONFLICT WITH THE FIRST BLOCK OF DATA FROM THE NEAR MEMORY TO THE FAR MEMORY, WHERE THE SECOND BLOCK OF DATA IS ENCRYPTED USING A SECOND KEY ASSOCIATED WITH A SECOND VIRTUAL MACHINE CORRESPONDING TO THE SYSTEM, AND WHERE THE SECOND KEY IS FOR EXCLUSIVE USE BY THE SECOND VIRTUAL MACHINE

700

(56) References Cited

U.S. PATENT DOCUMENTS

2020/0409740 A1\* 12/2020 Li .......................... G06F 21/53
2022/0414001 A1    12/2022 Agarwal et al.

OTHER PUBLICATIONS

"Compute Express Link Specification", In the White Paper of Compute Express Link, Revision 2.0, Oct. 26, 2020, 628 Pages.
"Trusted Execution Environment (TEE) 101: A Primer", In White Paper of A Secure Technology Alliance Mobile Council, Jun. 2018, 24 Pages.

\* cited by examiner

CONFIDENTIAL COMPUTE ARCHITECTURE INTEGRATED WITH DIRECT SWAP CACHING

BACKGROUND

Multiple users or tenants may share systems, including computing systems and communications systems. Computing systems may include the public cloud, the private cloud, or a hybrid cloud having both public and private portions. The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Multiple tenants may use compute, storage, and networking resources associated with the servers in the cloud. The compute, storage, and networking resources may be provisioned using a host operating system (OS) installed on a compute node (e.g., a server) in a data center. Each host OS may allow multiple virtual machines to access the compute and memory resources associated with a respective compute node. Because of the uneven usage of memory resources by the virtual machines supported by the host OS, the amount of memory resources may not be allocated efficiently. As an example, a large amount of memory may be unutilized by the host servers.

Provisioning of shared memory may alleviate some of these issues. However, the shared memory, when separated by an additional physical link (and a controller) from a CPU, may create additional security challenges for the tenants.

SUMMARY

In one aspect, the present disclosure relates to a method for managing a system having a near memory and a far memory. The method may include receiving a request from a requestor to read a first block of data that is either stored in the near memory or in the far memory, where the read request includes a first key associated with a first virtual machine corresponding to the system, where the first key is for exclusive use by the first virtual machine. The method may further include in response to determining that the far memory contains an encrypted version of the first block of data: (1) retrieving from the far memory the encrypted version of the first block of data, decrypting the first block of data using the first key, and providing a decrypted version of the first block of data to the requestor, and (2) swapping out a second block of data having an address conflict with the first block of data from the near memory to the far memory, where the second block of data is encrypted using a second key associated with a second virtual machine corresponding to the system, and where the second key is for exclusive use by the second virtual machine.

In another aspect, the present disclosure relates to a system having a near memory and a far memory. The system may include a near memory controller configured to receive a request from a requestor to read a first block of data that is either stored in the near memory or in the far memory, where the read request includes a first key associated with a first virtual machine corresponding to the system, where the first key is for exclusive use by the first virtual machine. The near memory controller may further be configured to in response to determining that the far memory contains an encrypted version of the first block of data: (1) retrieve from the far memory the encrypted version of the first block of data, decrypting the first block of data using the first key, and provide a decrypted version of the first block of data to the requestor, and (2) swap out a second block of data having an address conflict with the first block of data from the near memory to the far memory, where the second block of data is encrypted using a second key associated with a second virtual machine corresponding to the system, and where the second key is for exclusive use by the second virtual machine.

In a yet another aspect, the present disclosure relates to a method for managing a system having a near memory and a far memory, where the far memory is associated with a far memory system having a root port and an endpoint separated by at least one physical link. The method may include performing an integrity check for a set of transactions between the root port and the endpoint over the at least one physical link, where data associated with the set of transactions is released for further processing by the system before completing the integrity check. The method may further include receiving a request from a requestor to read a first block of data that is either stored in the near memory or in the far memory, where the read request includes a first key associated with a first virtual machine corresponding to the system, and where the first key is for exclusive use by the first virtual machine.

The method may further include in response to determining that the far memory contains an encrypted version of the first block of data: (1) retrieving from the far memory the encrypted version of the first block of data, decrypting the first block of data using the first key, and providing a decrypted version of the first block of data to the requestor, where a latency associated with the decrypting is sufficient to allow for a completion of the integrity check and (2) swapping out a second block of data having an address conflict with the first block of data from the near memory to the far memory, where the second block of data is encrypted using a second key associated with a second virtual machine corresponding to the system, and where the second key is for exclusive use by the second virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
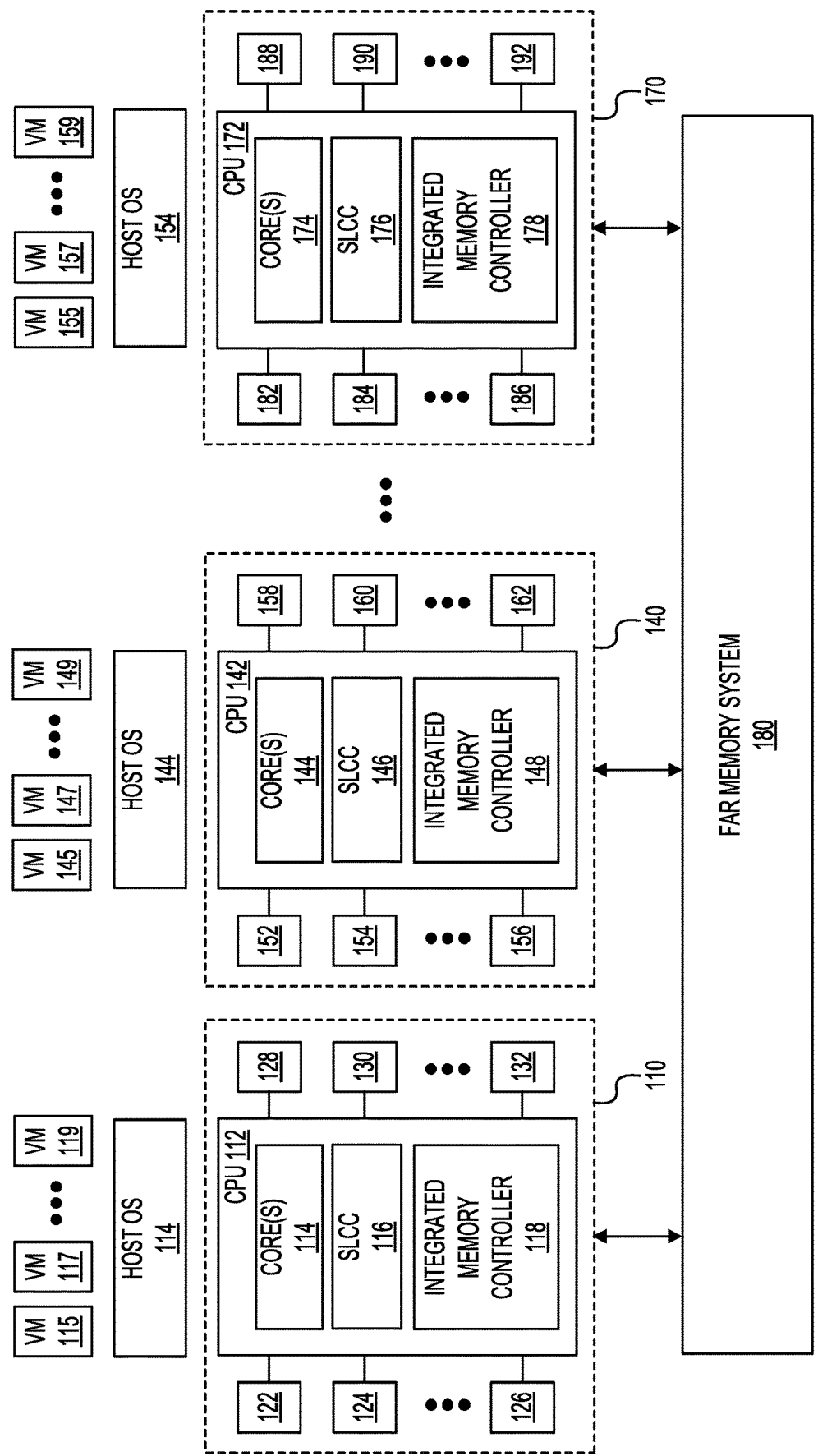
FIG. 1 is a block diagram of a system having both near memory and far memory in accordance with one example.

Examples described in this disclosure relate to systems and methods for a confidential compute architecture integrated with direct swap caching. Certain examples relate to the use of the confidential compute architecture in a multi-tenant computing system. The multi-tenant computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Virtual machines may be executed using compute and memory resources of the data center. As used herein, the term "virtual machine" encompasses, but is not limited to, any executable code (in the form of hardware, firmware, software, or in any combination of the foregoing) that implements a functionality, an application, a service, a micro-service, a container, or a unikernel for serverless computing. Alternatively, virtual machines may be executing on hardware associated with an edge-compute device, on-premises servers, or other types of systems, including communications systems, such as base stations (e.g., 5G or 6G base stations).

Consistent with the examples of the present disclosure, a virtual machine may have access to a combination of near memory (e.g., local DRAM) and far memory (e.g., an allocated portion of a pooled memory). As an example, the compute nodes in a data center may be allocated pooled memory exposed by a pooled memory system, which then may be made accessible to the virtual machine running on the compute node as far memory. The pooled memory relates to memory that includes any physical memory that is shared by multiple compute nodes. In addition, the data/instructions associated with a virtual machine may be swapped in and out of the near memory from/to the far memory. In this arrangement, the near memory (e.g., the local memory) may be implemented using expensive memory and the far memory (e.g., the pooled memory) may be implemented using cheaper memory. As an example, the expensive memory may correspond to double data rate (DDR) dynamic random access memory (DRAM) that operates at a higher data rate (e.g., DDR2 DRAM, DDR3 DRAM, DDR4 DRAM, or DDR5 DRAM) and the cheaper memory may correspond to DRAM that operates at a lower data rate (e.g., DRAM or DDR DRAM). Other cost differences may be a function of the reliability or other differences in quality associated with the near memory versus the far memory. As used herein the term "near memory" and "far memory" are to be viewed in relative terms. Thus, near memory includes any memory that is used for storing any data or instructions that is evicted from the system level cache(s) and the far memory includes any memory that is used for storing any data or instruction swapped out from the near memory. Another distinction between the near memory and the far memory relates to the relative number of physical links between the CPU and the memory. As an example, assuming the near memory is coupled via a near memory controller, thus being at least one physical link away from the CPU, the far memory is coupled to a far memory controller, which is at least one more physical link away from the CPU.

In certain environments, a customer of cloud computing services, including virtual machines, may not fully trust the security offered by the hypervisors deployed by the cloud computing provider, or may prefer to have an additional layer of trust. Using virtual machines, as an example, in such an environment, the customer may prefer to use their own keys to encrypt and decrypt data for storage or retrieval from the memory. In a traditional computing system with only the local memory attached to the processors executing the virtual machines, encryption and decryption across the memory path may be maintained. However, in a system including both the near memory (e.g., the local memory) and the far memory, this may be difficult because of the existence of additional physical links between the processors and the memory system. The additional physical links may create additional attack surfaces, potentially enabling a malicious actor to snoop data (including both encrypted and clear data) flowing across such physical links. One possible solution to address some aspects of these problems is to rely upon the far memory system (e.g., the Compute Express Link-based specification) to encrypt and decrypt data across the physical links between the processors and the near memory system and the far memory system. Such encryption and decryption, however, can introduce significant latency with respect to the memory transactions across the physical links of the far memory system. Moreover, ensuring the security of the encryption and decryption keys when they are being handled by the far memory system is difficult in view of the potential for sideband channel attacks and other intrusions. In addition, while such encryption and decryption by the far memory system may protect the data in transit on the physical links associated with the far memory system, the data at rest (stored in a memory) is not protected. Moreover, integrity checks of the encrypted data with respect to the data at rest may also not be provisioned. Certain examples described in the present disclosure address the confidential compute issues by integrating security and integrity with the direct swap caching mechanism.

FIG. 1 is a block diagram of a system 100 including compute nodes 110, 140, and 170 coupled with a far memory system 180 in accordance with one example. Each compute node may include compute and memory resources. As an example, compute node 110 may include a central processing unit (CPU) 112; compute node 140 may include a CPU 142; and compute node 170 may include a CPU 172. Although each compute node in FIG. 1 is shown as having a single CPU, each compute node may include additional CPUs, and other devices, such as graphics processor units (GPUs), field programmable gate arrays (FPGAs), application specific integrated circuits (ASICs), or other devices. In addition, each compute node may include near memory, which may be organized as memory modules. As an example, compute node 110 may include near memory in the form of memory modules 122, 124, 126, 128, 130, and 132.

Compute node 140 may include near memory in the form of memory modules 152, 154, 156, 158, 160, and 162. Compute node 170 may include near memory in the form of memory modules 182, 184, 186, 188, 190, and 192. Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as near memory.

With continued reference to FIG. 1, each CPU may further include core(s) (e.g., processing core(s)). As an example, CPU 112 may include core(s) 114, CPU 142 may include core(s) 144, and CPU 172 may include core(s) 174. Each CPU may further include system level cache controllers (SLCCs) and associated cache memory (e.g., system level cache (not shown)). As an example, CPU 112 may include system level cache controller (SLCC) 116, CPU 142 may include system level cache controller (SLCC) 146, and CPU 172 may include system level cache controller (SLCC) 176. Furthermore, each CPU may further include one or more integrated memory controllers. As an example, CPU 112 may include integrated memory controller 118, CPU 142 may include integrated memory controller 148, and CPU 172 may include integrated memory controller 178. The integrated memory controller included in such nodes may be a double dynamic rate (DDR) DRAM controller in case the memory modules include DDR DRAM.

Each compute node may be configured to execute several virtual machines. In this example, compute node 110 may have host OS 114 installed on it, compute node 140 may have host OS 144 installed on it, and compute node 170 may have host OS 174 installed on it. Far memory system 180 may include logical pooled memory, which may include several memory modules. Although not shown in FIG. 1, far memory system 180 may include a logical pooled memory controller (described later). Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as pooled memory.

Any of host OS (e.g., host OS 114, 144, or 174), being executed by any of compute nodes (e.g., compute node 110, 140, or 170), may access at least a portion of the physical memory included as part of far memory system 180. Each host OS may support a certain number of virtual machines. As an example, host OS 114 may support virtual machines (VMs) 115, 117, and 119, host OS 144 may support virtual machines (VMs) 145, 147, and 149, and host OS 154 may support virtual machines (VMs) 155, 157, and 159. Far memory system 180 may assign a portion of the pooled memory to the compute node when the compute node powers on or as part of allocation/deallocation operations. The assigned portion may include one or more "slices" of memory, where a slice refers to any smallest granularity of portions of memory managed by the pooled memory controller (e.g., a memory page or any other block of memory aligned to a slice size). Any suitable slice size may be used, including 1 GB slices, 2 GB slices, 8 GB slices, or any other suitable slice sizes. The pooled memory controller may assign or revoke assignment of slices to compute nodes based on an assignment/revocation policy associated with far memory system 180. As explained earlier, the data/instructions associated with a host OS may be swapped in and out of the near memory from/to the far memory. In this arrangement, the near memory (e.g., the local memory) may be implemented using expensive memory and the far memory (e.g., the pooled memory) may be implemented using cheaper memory.

In one example, compute nodes 110, 140, and 170 may be part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In one example, each cluster may include several identical compute nodes. Thus, a cluster may include compute nodes including a certain number of CPU cores and a certain amount of memory. Instead of compute nodes, other types of hardware such as edge-compute devices, on-premises servers, or other types of systems, including communications systems, such as base stations (e.g., 5G or 6G base stations) may also be used. Although FIG. 1 shows system 100 as having a certain number of components, including compute nodes and memory components, arranged in a certain manner, system 100 may include additional or fewer components, arranged differently. As an example, the memory controllers may not be integrated with the CPU and may be on a separate substrate. As another example, far memory system 180 may be included as part of each compute node instead of being a separate system as shown in FIG. 1.

Figure 2:
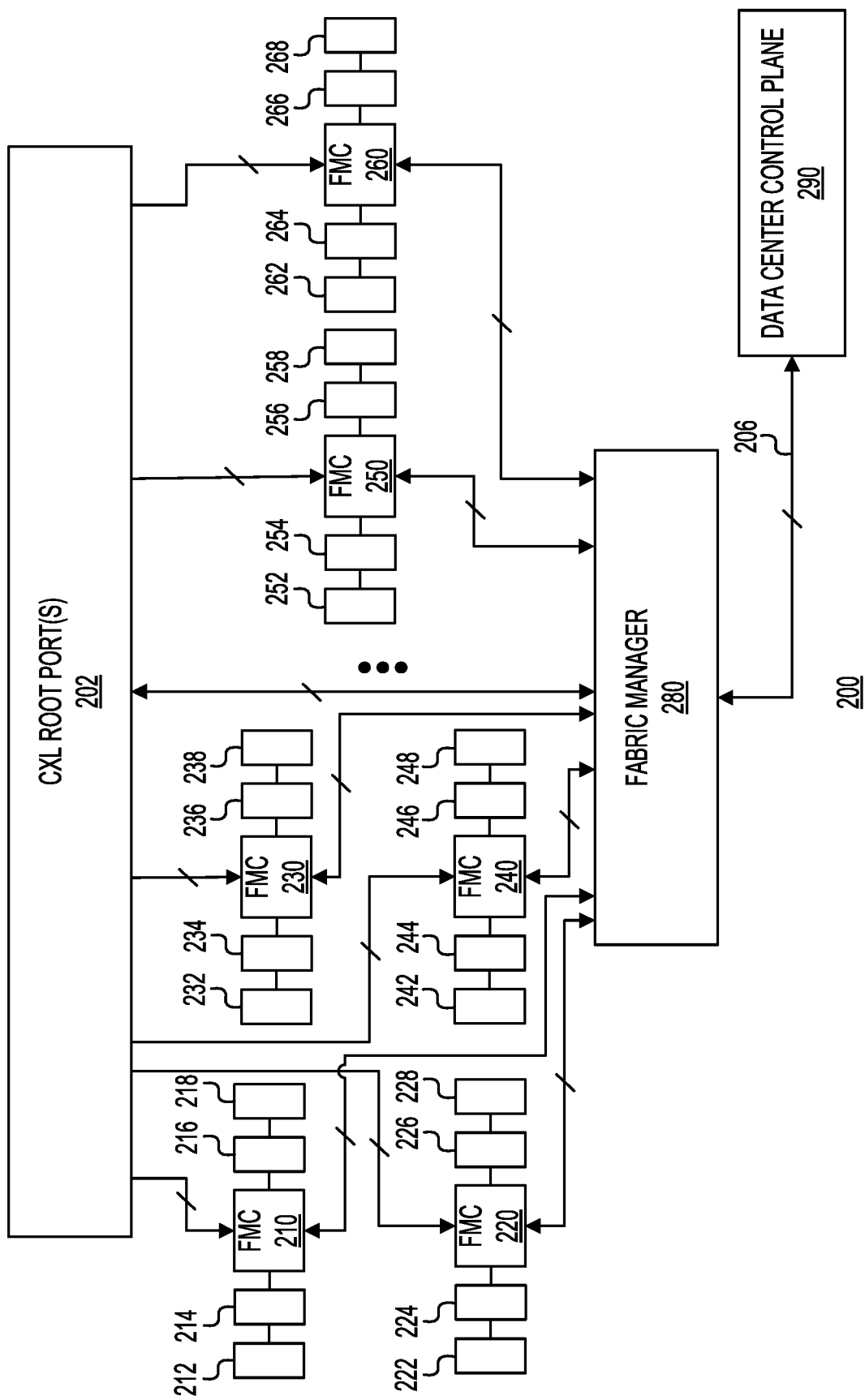
FIG. 2 shows a block diagram of a far memory system.

FIG. 2 shows a block diagram of an example far memory system 200 corresponding to the far memory system 180 shown in FIG. 1. Far memory system 200 may include one or more root port(s) 202 for coupling the far memory system controllers to compute nodes (e.g., compute nodes 110, 130, and 150 of FIG. 1). Far memory system 200 may further include several pooled memory controllers and associated pooled memory modules. As an example, far memory system 200 may include far memory controller (FMC) 210, FMC 220, FMC 230, FMC 240, FMC 250, and FMC 260 coupled to root port(s) 202, as shown in FIG. 2. Each of FMC 210, FMC 220, FMC 230, FMC 240, FMC 250, and FMC 260 may further be coupled to fabric manager 280. FMC 210 may further be coupled to memory modules 212, 214, 216, and 218. FMC 220 may further be coupled to memory modules 222, 224, 226, and 228. FMC 230 may further be coupled to memory modules 232, 234, 236, and 238. FMC 240 may further be coupled to memory modules 242, 244, 246, and 248. FMC 250 may further be coupled to memory modules 252, 254, 256, and 258. FMC 260 may further be coupled to memory modules 262, 264, 266, and 268. Each memory module may be a dual-in-line memory module (DIMM) or a single-in-line memory module (SIMM).

With continued reference to FIG. 2, in one example, each of the far memory controllers may be implemented as a Compute Express Link (CXL) specification compliant pooled memory controller. In this example, each of the memory modules associated with far memory system 200 may be configured as Type 3 CXL devices. Fabric manager 280 may communicate via bus 206 with data center control plane 290. In one example, fabric manager 280 may be implemented as a CXL specification compliant fabric manager. Control information received from data center control plane 290 may include control information specifying which slices of memory from the memory pool are allocated to any particular compute node at a given time. In response to this control information, fabric manager 280 may allocate a slice of memory from within the far memory to a specific compute node in a time-division multiplexed fashion. In other words, at a time a particular slice of memory could only be allocated to a specific compute node and not to any other compute nodes. As part of this example, transactions associated with CXL.io protocol, which is a PCIe-based non-coherent I/O protocol, may be used to configure the memory devices and the links between the CPUs and the memory modules included in far memory system 200. The CXL.io protocol may also be used by the CPUs associated with the various compute nodes in device discovery, enumeration, error reporting, and management. Alternatively, any other I/O protocol that supports such configuration transactions may also be used. The memory access to the memory modules may be handled via the transactions associated with CXL.mem protocol, which is a memory access protocol that supports memory transactions. As an example, load instructions and store instructions associated with any of the CPUs may be handled via CXL.mem protocol. Alternatively, any other protocols that allow the translation of the CPU load/store instructions into read/write transactions associated with memory modules included in far memory system 200 may also be used.

Each far memory controller (e.g., any of FMC 210, FMC 220, FMC 230, FMC 240, FMC 250, and FMC 260) may maintain a segment table indicating different portions of the far memory (e.g., implemented as a pooled memory) that may be assigned/un-assigned, at any suitable granularity with regard to portion sizes. More generally, the far memory controller may maintain any suitable table representing available/assigned memory slices, indicating any relevant information pertaining to slices (e.g., assigned/unassigned status, ownership status indicating which compute node an assigned slice is assigned to, recency of use information, recency of assignment information, host type or other metadata pertaining to the compute node the assigned slice is assigned to). For example, for a 2 TB memory pool, portions may be assigned/unassigned at a 1 GB slice granularity, e.g., there may be 2K (e.g., 2048) segments in the segment table indicating different 1 GB slices. As an example, a segment in the segment table may comprise a 32-bit segment identifier that includes 8 bits indicating which host a portion is assigned to, a 1-bit value indicating whether the portion was ever accessed, a 3-bit decoder map indicating a target address decoding scheme for addressing data in the portion, and/or a 16-bit leaky bucket counter indicating a count value of recent accesses to the portion. For example, the segment table described above may comprise an 8 KB region of SRAM of the pooled memory controller. The above-described schema for a segment table is non-limiting, and the segment table may comprise any suitable data for tracking assignment of memory. Although FIG. 2 shows far memory system 200 as having a certain number of components, including pooled memory controllers and memory modules, arranged in a certain manner, far memory system 200 may include additional or fewer components, arranged differently. In addition, multiple switches may be used. Moreover, fabric manager 280 may be shared with additional or fewer pooled memory controllers.

In order to use direct swap caching in the context of system 100 of FIG. 1, the near memory must have a fixed ratio with the far memory. In this example, it is assumed that near memory has the same size as the far memory. This means that any access to a location in the near memory will operate in the direct swap cache manner. Thus, these accesses will first perform a lookup within the memory designated as the near memory. Consistent with a non-optimized direct swapping cache arrangement, any hit in the near memory will be serviced directly out of the near memory (e.g., the local memory), whereas a miss in the near memory will cause a swap operation between the corresponding far memory and near memory locations. Swapping operations (e.g., swapping data from the locations in the far memory into the locations in the near memory or swapping data out from the locations in the near memory into the locations in the far memory) may be performed at a granularity level of a cache line. Thus, in this example the block of data equates to the cache line. However, in this example, each location can have only one of the two cache lines at a given time. The other cache line is present in the far memory.

Each cache line may include a combination of a data portion (e.g., 512 bits) and a metadata portion (e.g., 128 bits). The data portion may contain data representing user data or instructions executed by a compute node. The metadata portion may include data representing various attributes of the data in the data portion. The metadata portion can also include error checking and correction bits or other suitable types of information. In addition, the metadata portion may include a tag having an appropriate number of bit(s) to distinguish between the location of a cache line. A single bit of metadata information could be used to distinguish the location of two cache lines (e.g., CL $A and CL $B). The use of a single bit assumes a fixed ratio of 1:1 between a swappable range for the near memory and a swappable range for the far memory. The present disclosure, however, is not limited to the use of a fixed ratio of 1:1 between the swappable range for the near memory and the swappable range for the far memory. As an example, a ratio of 1:3 may be used. In such a case, additional tag bits may be required to encode the information concerning the location of the cache line in terms of the region of the memory having the cache line.

Each VM (e.g., any of VMs 115, 117, . . . 159 of FIG. 1) may have a virtual trusted platform module (TPM) instance, running in a secure environment associated with the specific VM. The virtual TPM instance may serve as a dedicated secure vault for storing any keys for encrypting and decrypting data for the specific VM. In other words, there may be at least one key per-VM, allowing each VM to provide that specific key to the internal memory controller included within (or associated with) the CPU that is executing the VM. The virtual TPM may also allow the VM to boot in a trusted manner. Each internal memory controller (e.g., any of internal memory controllers 118, 148, and 178 of FIG. 1) may include an advanced encryption standard (AES) engine. The AES engine may provide hardware acceleration for encrypting and decrypting data based on a per-VM key basis. The AES engine may support the use of various key sizes, including key sizes of 128, 192, and 256 bits. The encryption/decryption may be performed using software only, as well.

Figure 3A:
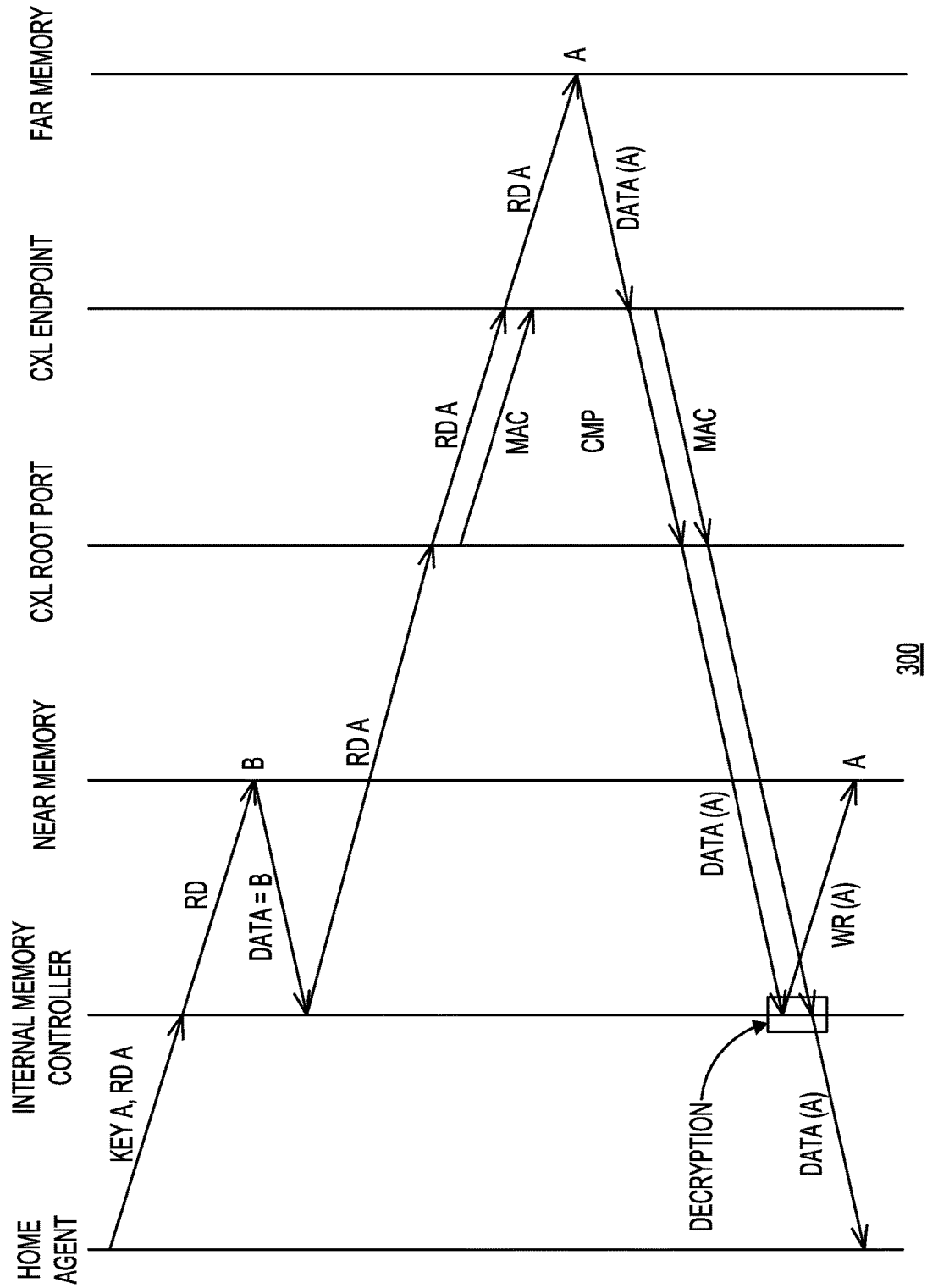
FIGS. 3A and 3B show an example transaction flow related to a read operation when there is a miss.
Figure 3B:
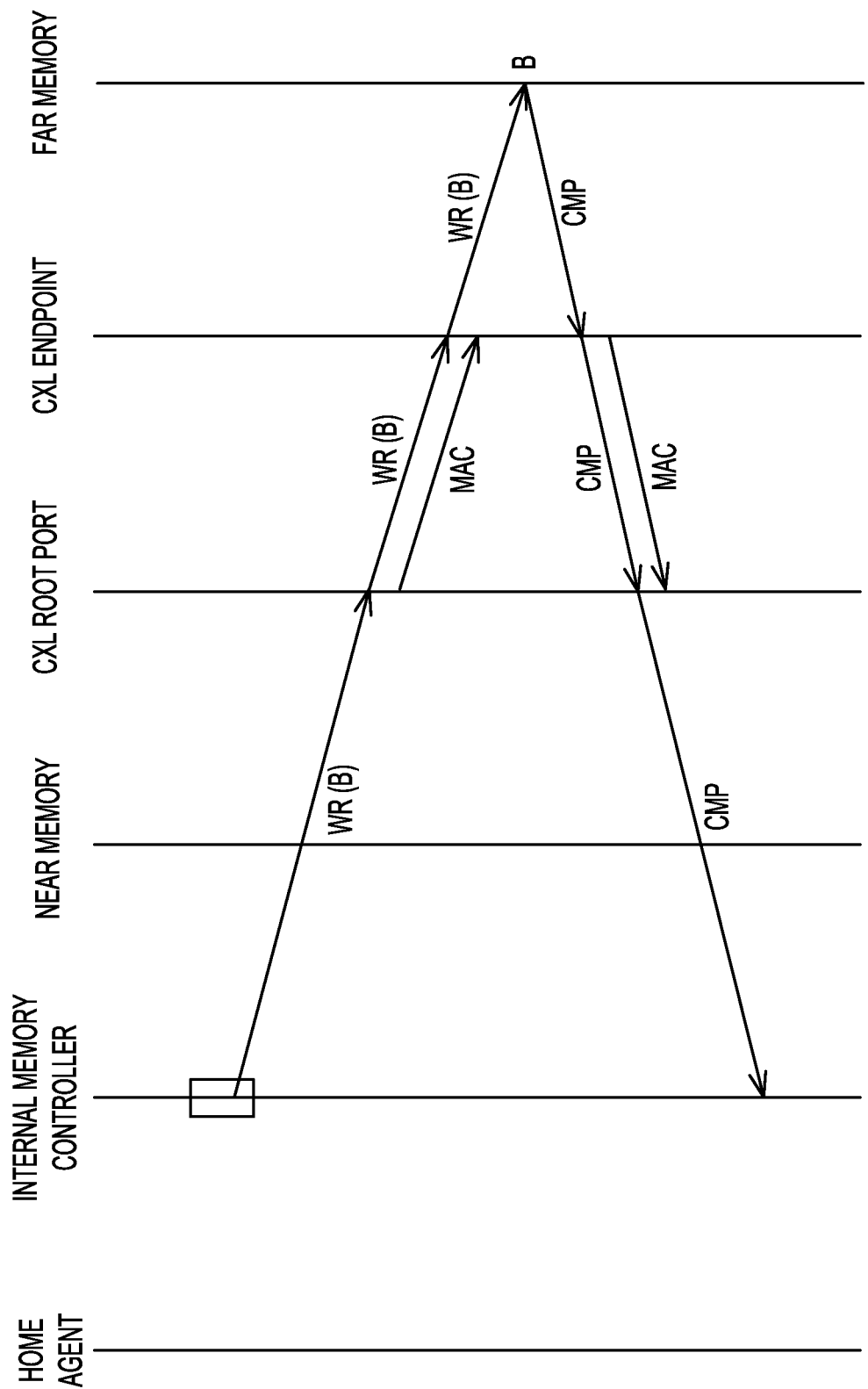

FIGS. 3A and 3B show an example transaction flow 300 related to a read operation when there is a miss, in that the requested data is not in the near memory. During a read operation, a CPU (e.g., any of CPUs 112, 142, or 172 of FIG. 1) can issue a command that is processed by a home agent associated with an internal memory controller (e.g., any of internal memory controllers 118, 148, and 178 of FIG. 1) to read data. In this example, as shown in FIG. 3A, there is a read request from the home agent to read cache line CL $A. The read request not only includes the address for the cache line, but also the key associated with the VM making the request. The home agent may be the last level cache controller (e.g., any of SLCC 116, SLCC 146, and SLCC 176 of FIG. 1) or any other controller that controls the coherency for a given cache line. The home agent may ensure that if multiple cores associated with a CPU are requesting access to cache lines, then those requests are processed by the same control logic—e.g., the home agent. The internal memory controller (e.g., any of the internal memory controllers described earlier with respect to FIG. 1) checks the contents of the near memory. Operationally, in response to a read request for cache line CL $A, if the metatag portion, indicates that the near memory contains cache line CL $B, then that results in a miss. Accordingly, the internal memory controller sends a request for cache line CL $A to the far memory system. In addition, a blocking entry is set in the internal memory controller for the other cache line entry that maps to the near memory location.

In this example, the far memory system is assumed to be a CXL-specification compliant system, thus the request for cache line CL $A goes to the CXL root port. This example further assumes that any transactions across each CXL-link (from the CXL root port to the CXL endpoint) are encrypted. The CXL root port can be viewed as similar to PCIe root port and the CXL endpoint can be viewed as similar to a PCIe endpoint. As such, any technology with root ports and endpoints can be used to enumerate the links. The link-level encryption results in a double encryption of the data being transported across the links.

With continued reference to FIG. 3A, in addition, the CXL root port may generate a message authentication code (MAC) to ensure the integrity of the data across the physical link. Data across the physical links may be transported in flits (e.g., 512 bits) including the MAC header. In one example, multiple flits may be processed at the same time to generate the MAC for the multiple flits, so that the MAC is not generated for each flit. As an example, four flits may be processed to generate the MAC. The MAC may be generated using cryptographic hash functions (e.g., HMAC) or using block cipher algorithms.

Still referring to FIG. 3A, the read A request travels from the CXL root port to the CXL endpoint, which in turn retrieves the data from the far memory. The CXL endpoint verifies the integrity of the received data by locally generating a MAC based on the received flits and comparing the generated MAC with the received MAC. The retrieved data for cache line CL $A travels back from the CXL endpoint to the CXL root port. The CXL endpoint also generates a MAC for a certain number of flits and transmits that back to the CXL root port. The CXL root port verifies the integrity of the received data by locally generating a MAC based on the received flits and comparing the generated MAC with the received MAC. The data is received by the internal memory controller, which uses the per-VM key (key A) to decrypt the data and provide the data to the requestor (e.g., the home agent). The data (A) is also stored in the near memory as part of the swapping of data between the near memory and the far memory.

In addition, as shown in FIG. 3B, as part of this swap operation, the data corresponding to cache line CL $B is written to the far memory. As part of this process, the already encrypted data (encrypted by the internal memory controller using the per-VM key) is transmitted to the CXL root port. The CXL root port further encrypts the data across the physical link between the CXL root port and the CXL endpoint. The CXL root port also generates a message authentication code (MAC) to ensure the integrity of the data across the physical link. The CXL endpoint writes the data corresponding to cache line CL $B to the far memory. A completion (CMP) message is transmitted back to the internal memory controller.

With respect to the integrity-related processing (using the MAC) shown in FIGS. 3A and 3B, the system may operate in two modes. One mode may be referred to as the containment mode and the other mode may be referred to as the skid mode. In the containment mode, the CXL endpoint may only release the data after the integrity check passes. As a result, several flits (e.g., four flits) may need to be buffered until the MAC has been received by the CXL endpoint and the integrity check (e.g., by comparing the locally generated MAC with the received MAC) has been performed. This may impact the latency of the operations associated with the far memory. However, the systems described in FIGS. 1 and 2 may mitigate this impact by ensuring that the hit rate for the near memory is high, such that fewer memory accesses require the swapping of the data between the near memory and the far memory.

Another way to mitigate the latency may be to use the other mode—the skid mode. In one example, in the skid mode the received data is released without waiting to receive the MAC. When the MAC is received (e.g., by the CXL endpoint), then the locally generated MAC can be compared against the received MAC. While this mode reduces the latency, compromised or otherwise corrupted data may be transmitted before the integrity check has been completed. However, as explained with respect to FIGS. 3A and 3B, as part of direct swap caching with encryption/decryption, the data from the far memory is not directly sent to the requestor (e.g., the home agent). Instead, the data is first sent to the internal memory controller which needs to decrypt the data before sending the data to the requestor. There is a certain amount of latency associated with the decryption operation. In some instances, the decryption latency may be of enough time for the integrity check to be completed in the skid mode, and thereby allow the internal memory controller to be notified of any integrity violation before the internal memory controller provides the data to the requestor. In other words, in almost all instances, the internal memory controller may be made aware of any integrity check related issues because the internal memory controller will require a certain amount of time to decrypt the data, which may almost be the same amount of time as required for the integrity check. In sum, the integrity check and the decryption operations may be parallelized. As a result, instead of using the containment mode to ensure integrity, and suffer a higher latency, the skid mode with a lower latency may be used since the likelihood of the corrupted data being provided to the requestor is very small.

Figure 4:
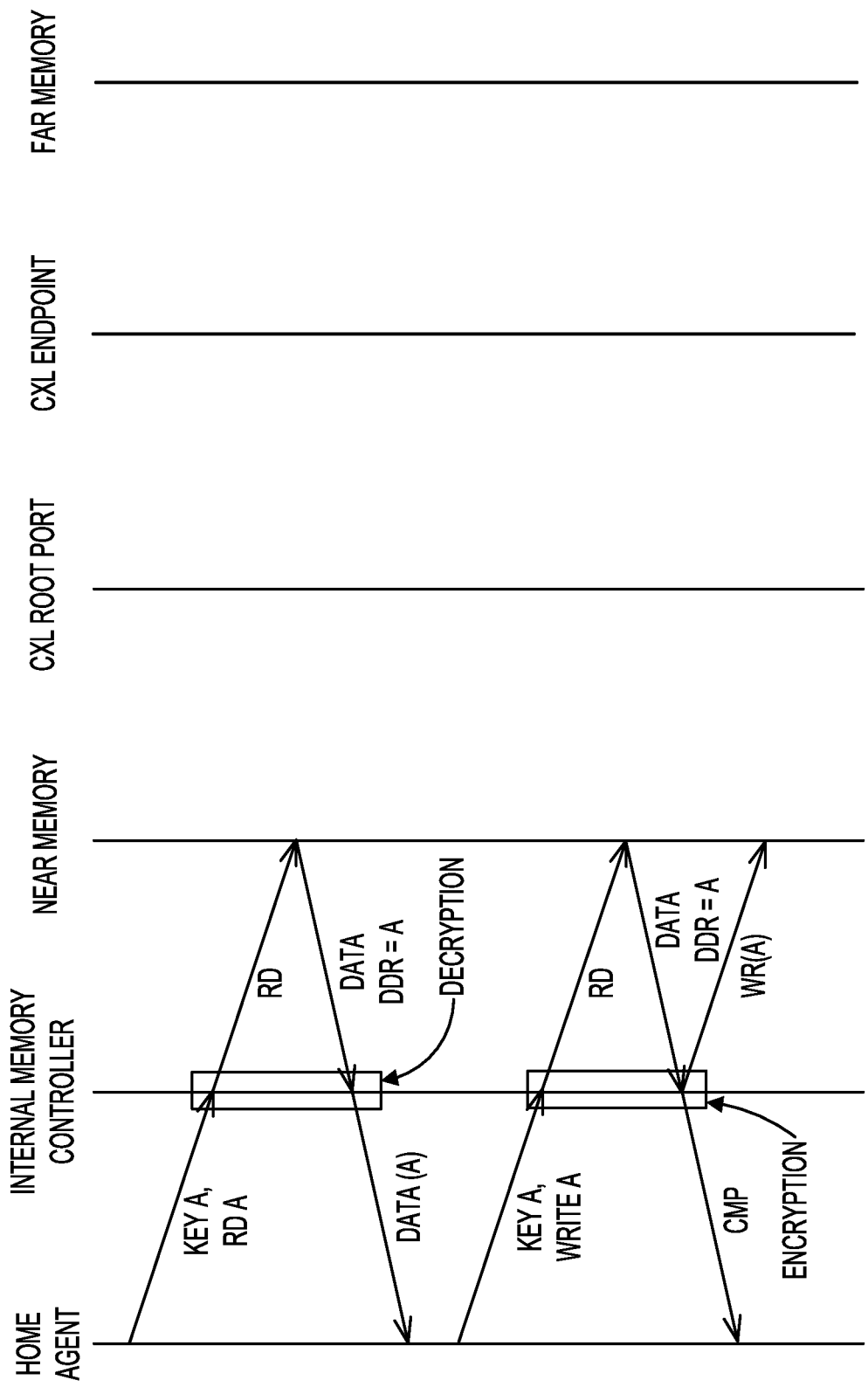
FIG. 4 is a diagram showing an example transaction flow related to a read operation and a write operation when there is a hit, in that the data targeted by the read operation and the write operation is in the near memory.

FIG. 4 is a diagram showing an example transaction flow 400 related to a read operation and a write operation when there is a hit, in that the data targeted by the read operation and the write operation is in the near memory. During a read operation, a CPU (e.g., any of CPUs 112, 142, or 172 of FIG. 1) can issue a command that is processed by a home agent associated with an internal memory controller (e.g., any of internal memory controllers 118, 148, and 178 of FIG. 1) to read the data. In this example, there is a read request from the home agent to read cache line CL $A. The read request not only includes the address for the cache line, but also the key associated with the VM making the request. The internal memory controller (e.g., any of the internal memory controllers described earlier with respect to FIG. 1) checks the contents of the near memory. The metatag portion in this example indicates that the near memory contains cache line CL $A, resulting in a hit. Accordingly, the internal memory controller retrieves the data for cache line CL $A from the near memory. In this example, the far memory system is assumed to be a CXL-specification compliant system, thus if there had been a miss, the request for cache line CL $A would have gone to the CXL root port. This example further assumes that any transactions across each CXL-link (from the CXL root port to the CXL endpoint) are encrypted. The internal memory controller decrypts the data using the per-VM key (key A) and provides the data to the home agent.

With continued reference to FIG. 4, in this example with respect to the write A operation, when a cache line is written to the memory, every write needs to be preceded by a read to ensure that the near memory location contains the address being written. Thus, the internal memory controller first issues a read command to read the data from the near memory, which happens to be the data being written so there is a hit. Next, the internal memory controller encrypts the data with the per-VM key (e.g., key A) and writes the data to the near memory. Finally, the internal memory controller sends the completion (CMP) message to the home agent.

In addition, direct swap caching may also be used with a trusted domain identifier (TDI) in trusted execution environment access control (TEE-AC) architectures. In one example, the TDI bit may be assigned by a trusted agent running on the compute platform. The trusted agent may be trusted by the VMs because each VM audits and signs the code associated with the trusted agent. The TDI may be used to address threats, such as ciphertext disclosure, memory corruption, aliases, and remapping. As an example, each VM having a separate trusted domain may be isolated from the other VMs and any hypervisor (or host OS) software. The TDI is held as a cache line granular metadata in the memory. However, when the memory content is swappable as part of direct swap caching between the near memory and the far memory, the metadata has to be shipped across the CXL physical links when a swap operation is performed. To avoid the shipping of the TDI across the CXL physical links, two techniques are disclosed. The first technique adds the TDI to the metadata being held by the internal memory controller. The second technique uses page mapping to the same page, as explained later.

As part of the first technique, a TDI bit for each cache line, regardless of whether it is located in the near memory or the far memory, may be managed by the internal memory controller (e.g., any of internal controllers shown in FIG. 1), held in the near memory, and never transmitted to the far memory. Table 1 below shows additional bits to track the TDI, when the TDI is one bit. The bits shown below in Table 1 may be stored in the near memory on a per cache line basis.

TABLE 1

| Bit | Description |
| --- | --- |
| a | Indicates whether the cache line in the near memory is cache line $A or cache line $B |
| b | TDI value of the cache line in the near memory |
| c | TDI value of the cache line in the far memory |

The second technique takes advantage of the fact that in certain systems the trusted domain assignment is performed on a page-granular basis. As part of this technique the addresses in a system address map may be allocated in a manner where a given near memory/far memory cache-line pair always maps to the same page. This way, advantageously, there is no need to transfer the TDI information on the CXL physical links because the TDI information will have the same value for both near memory and far memory contents associated with a specific VM.

As an example, a system address map may be set up to carve up the swappable range of addresses into smaller granular page-sized regions. As an example, assuming 2 terabytes (TB) of memory range is available for use with the system address map (the page size is 1 GB), 1 TB is configured as a non-swappable range and 1 TB is configured as a swappable range. A low order address bit may be used to carve this memory range (swappable range) into half-page-sized granular regions, each having a size of 512 MB. In this arrangement, as long as a tenant (e.g., any of the virtual machines hosted by that compute node) is allocated an address range equal to 1 GB (twice the size of the smaller granular page-sized regions), then the cache-line pairs associated with a virtual machine map to the same page. The address range allocated to each tenant can be viewed as having a conflict set size (e.g., 1 GB), which in this example is selected to be of the same size as the page size associated with the system. The host OS (e.g., a hypervisor) can allocate memory to the tenants in 1 GB increments. Each 1 GB increment need not be contiguous. Each conflict set (having two conflicting 512 MB swappable regions) corresponds to a single 512 MB region in the physical memory accessible to a tenant (e.g., the DRAM). Thus, a single 1 GB page corresponds to a single 512 MB region in the physical memory. In this example, a low order address bit (e.g., address bit 29) can have a logical value of "0" or "1" to distinguish between the two 512 MB conflicting regions. When the logical value for the address bit 29 is "0," then the cache line's address corresponds to one of the 512 MB conflicting regions and when the logical value for the address bit 29 is "1," then the cache line's address corresponds to the other 512 MB conflicting region. Other types of encodings may also be used as part of the addressing to distinguish between the two conflicting regions.

Figure 5:
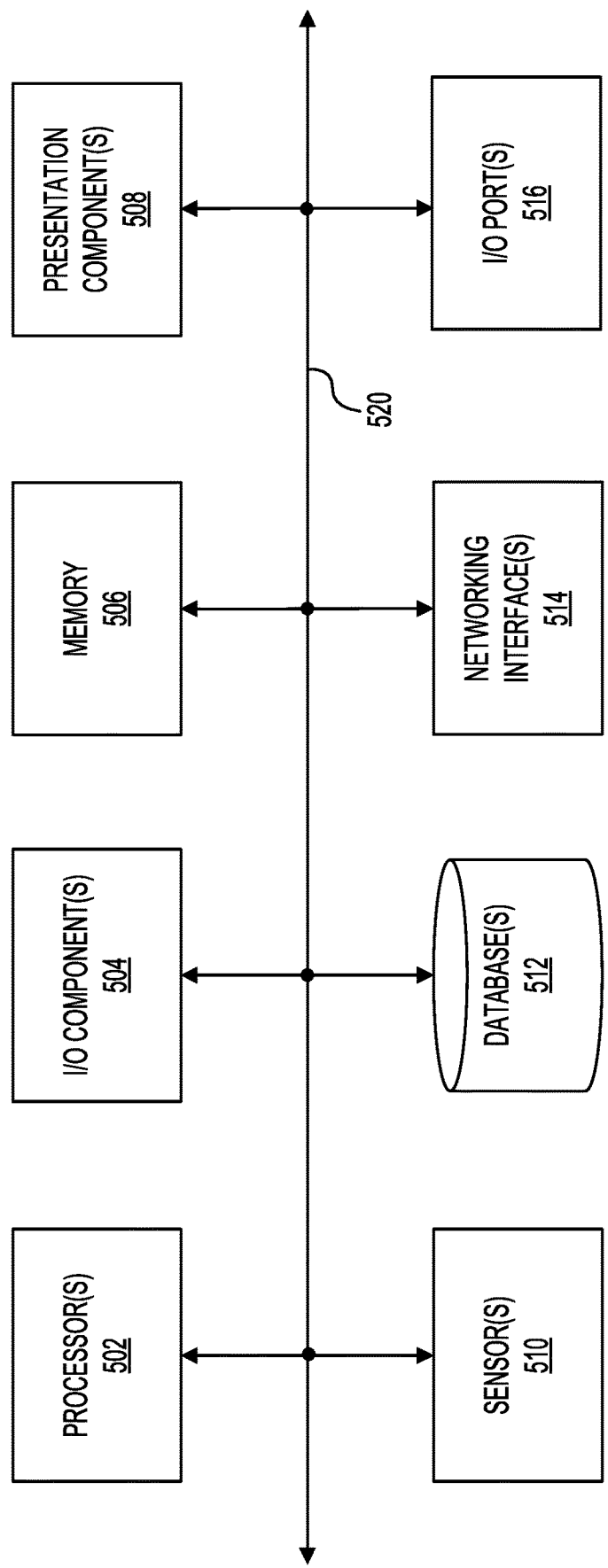
FIG. 5 shows a block diagram of an example system for implementing at least some of the methods for a confidential compute architecture for use with direct swap caching.

FIG. 5 shows a block diagram of an example system 500 for implementing at least some of the methods for integrated memory pooling and direct swap caching. System 500 may include processor(s) 502, I/O component(s) 504, memory 506, presentation component(s) 508, sensors 510, database(s) 512, networking interfaces 514, and I/O port(s) 516, which may be interconnected via bus 520. Processor(s) 502 may execute instructions stored in memory 506. I/O component(s) 504 may include components such as a keyboard, a mouse, a voice recognition processor, or touch screens. Memory 506 may be any combination of non-volatile storage or volatile storage (e.g., flash memory, DRAM, SRAM, or other types of memories). Presentation component(s) 508 may include displays, holographic devices, or other presentation devices. Displays may be any type of display, such as LCD, LED, or other types of display. Sensor(s) 510 may include telemetry or other types of sensors configured to detect, and/or receive, information (e.g., collected data). Sensor(s) 510 may include telemetry or other types of sensors configured to detect, and/or receive, information (e.g., memory usage by various virtual machines being executed by various compute nodes in a data center). Sensor(s) 510 may include sensors configured to sense conditions associated with CPUs, memory or other storage components, FPGAs, motherboards, baseboard management controllers, or the like. Sensor(s) 510 may also include sensors configured to sense conditions associated with racks, chassis, fans, power supply units (PSUs), or the like. Sensor(s) 510 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 5, database(s) 512 may be used to store any of the data collected or logged and as needed for the performance of methods described herein. Database(s) 512 may be implemented as a collection of distributed databases or as a single database. Network interface(s) 514 may include communication interfaces, such as Ethernet, cellular radio, Bluetooth radio, UWB radio, or other types of wireless or wired communication interfaces. I/O port(s) 516 may include Ethernet ports, Fiber-optic ports, wireless ports, or other communication or diagnostic ports. Although FIG. 5 shows system 500 as including a certain number of components arranged and coupled in a certain way, it may include fewer or additional components arranged and coupled differently. In addition, the functionality associated with system 500 may be distributed, as needed.

Figure 6:
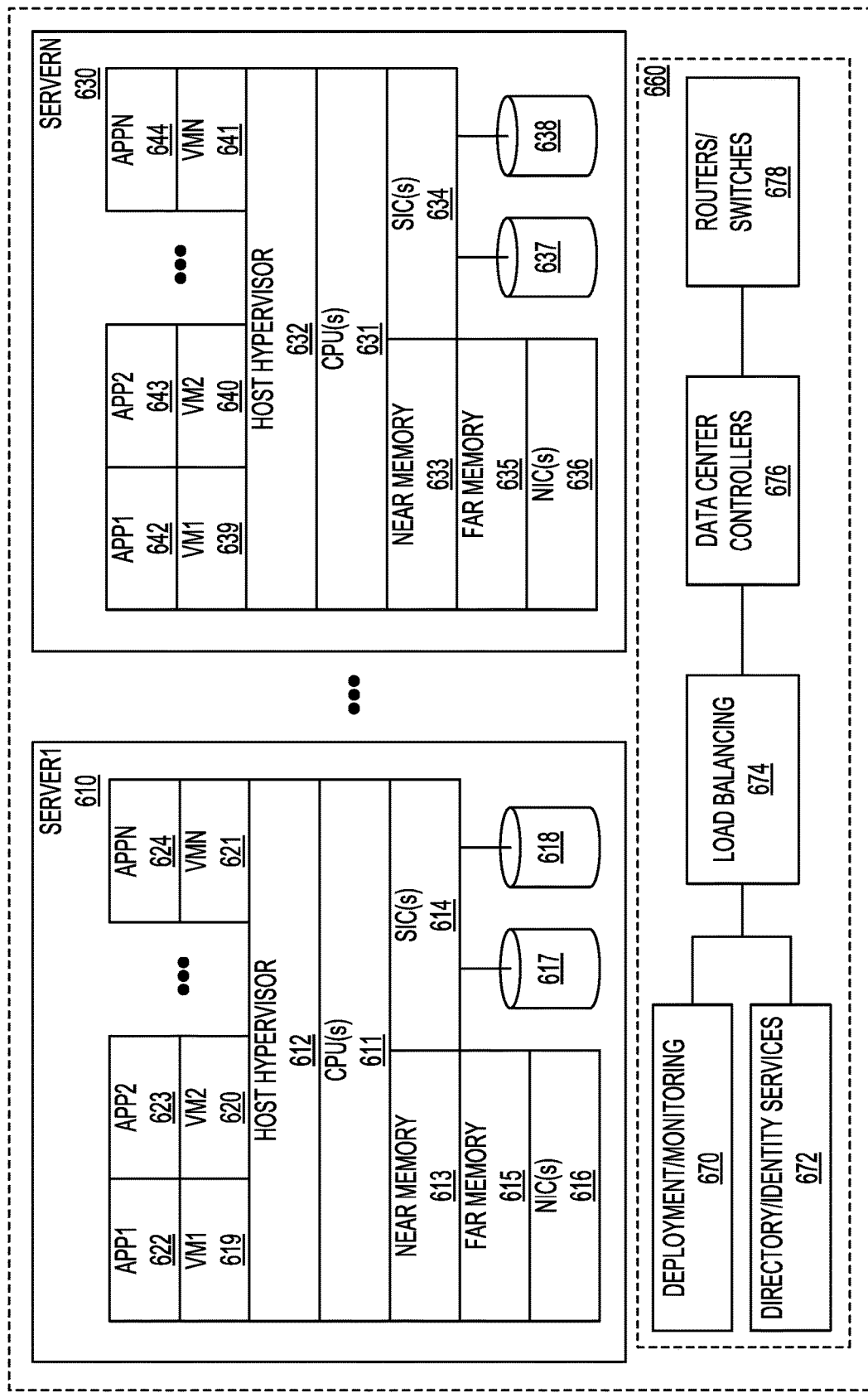
FIG. 6 shows a data center for implementing a system for a confidential compute architecture for use with direct swap caching.

FIG. 6 shows a data center 600 for implementing a system for integrated memory pooling and direct swap caching in accordance with one example. As an example, data center 600 may include several clusters of racks including platform hardware, such as compute resources, storage resources, networking resources, or other types of resources. Compute resources may be offered via compute nodes provisioned via servers that may be connected to switches to form a network. The network may enable connections between each possible combination of switches. Data center 600 may include server1 610 and serverN 630. Data center 600 may further include data center related functionality 660, including deployment/monitoring 670, directory/identity services 672, load balancing 674, data center controllers 676 (e.g., software defined networking (SDN) controllers and other controllers), and routers/switches 678. Server1 610 may include CPU(s) 611, host hypervisor 612, near memory 613, storage interface controller(s) (SIC(s)) 614, far memory 615, network interface controller(s) (NIC(s)) 616, and storage disks 617 and 618. Far memory 615 may be implemented as a pooled memory, as explained earlier. ServerN 630 may include CPU(s) 631, host hypervisor 632, near memory 633, storage interface controller(s) (SIC(s)) 634, far memory 635, network interface controller(s) (NIC(s)) 636, and storage disks 637 and 638. Far memory 635 may be implemented as a pooled memory, as explained earlier. Server1 610 may be configured to support virtual machines, including VM1 619, VM2 620, and VMN 621. The virtual machines may further be configured to support applications, such as APP1 622, APP2 623, and APPN 624. ServerN 630 may be configured to support virtual machines, including VM1 639, VM2 640, and VMN 641. The virtual machines may further be configured to support applications, such as APP1 642, APP2 643, and APPN 644.

With continued reference to FIG. 6, in one example, data center 600 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 6 shows data center 600 as including a certain number of components arranged and coupled in a certain way, it may include fewer or additional components arranged and coupled differently. In addition, the functionality associated with data center 600 may be distributed or combined, as needed.

Figure 7:
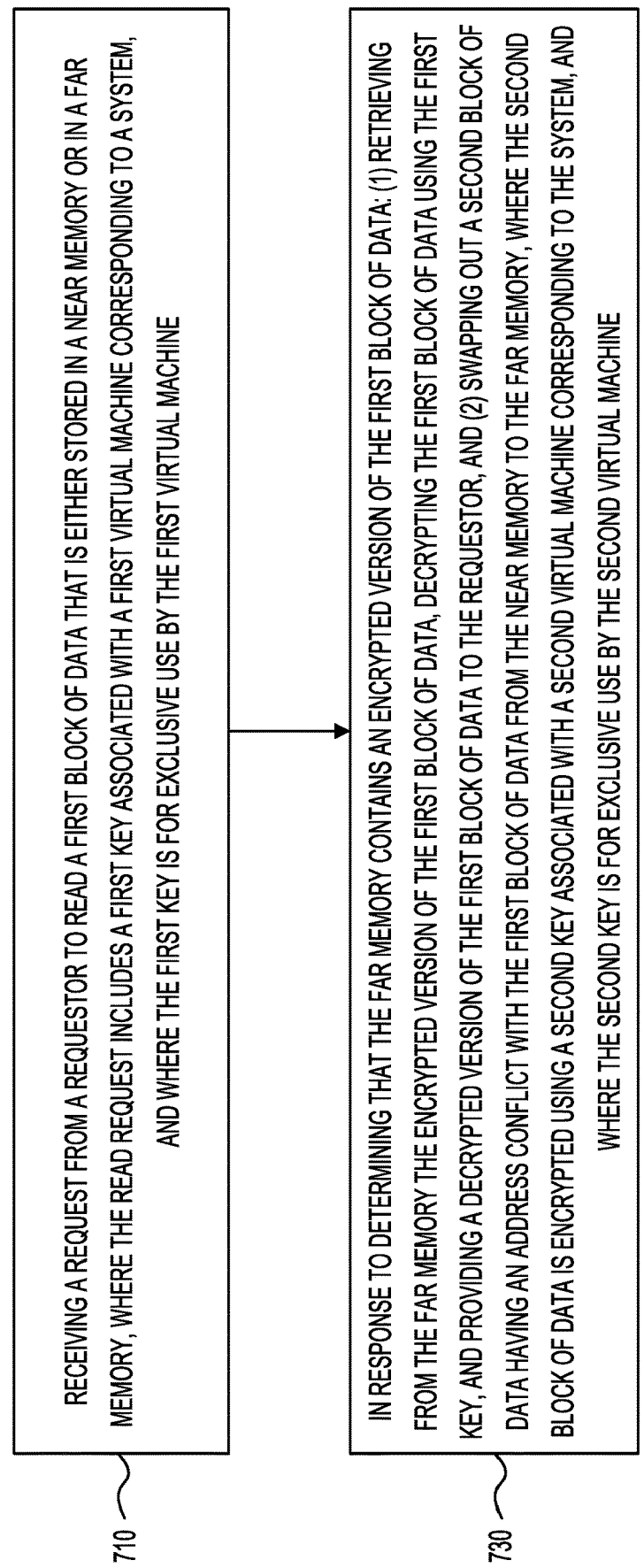
FIG. 7 shows a flow chart of an example method for managing a memory having a near memory and a far memory.

FIG. 7 shows a flow chart 700 of an example method for managing a memory having a near memory and a far memory. In one example, steps associated with this method may be executed by various components of the systems described earlier (e.g., system 100 of FIG. 1 and system 200 of FIG. 2). Step 710 may include receiving a request from a requestor to read a first block of data that is either stored in the near memory or in the far memory, where the read request includes a first key associated with a first virtual machine corresponding to the system, where the first key is for exclusive use by the first virtual machine. As an example, the read request may be similar to the Rd A request described earlier with respect to transaction flow 300 of FIG. 3A. As explained earlier, during a read operation, a CPU (e.g., any of CPUs 112, 142, or 172 of FIG. 1) can issue a command that is processed by a home agent associated with an internal memory controller (e.g., any of internal memory controllers 118, 148, and 178 of FIG. 1) to read data. In this example, as shown in FIG. 3A, there is a read request from the home agent to read a block of data (e.g., cache line CL $A). The read request not only includes the address for the cache line, but also the key associated with the VM making the request.

Step 720 may include in response to determining that the far memory contains an encrypted version of the first block of data: (1) retrieving from the far memory the encrypted version of the first block of data, decrypting the first block of data using the first key, and providing a decrypted version of the first block of data to the requestor, and (2) swapping out a second block of data having an address conflict with the first block of data from the near memory to the far memory, where the second block of data is encrypted using a second key associated with a second virtual machine corresponding to the system, and where the second key is for exclusive use by the second virtual machine. The memory controller (e.g., any of the near memory controllers described earlier with respect to FIG. 1) may analyze the metadata portion associated with the block of data to determine that the far memory contains the encrypted version of the block of data. As described with respect to transaction flow 300 of FIG. 3A, data may be swapped out of the near memory to the far memory when there is a miss on a read request. In addition, as explained earlier, the near memory controller may decrypt the data using the key specific to the virtual machine on whose behalf the read operation was initiated. Advantageously, the use of per-VM key (the first key for the first VM and the second key for the second VM) may allow for confidential compute and isolation among virtual machines.

Figure 8:
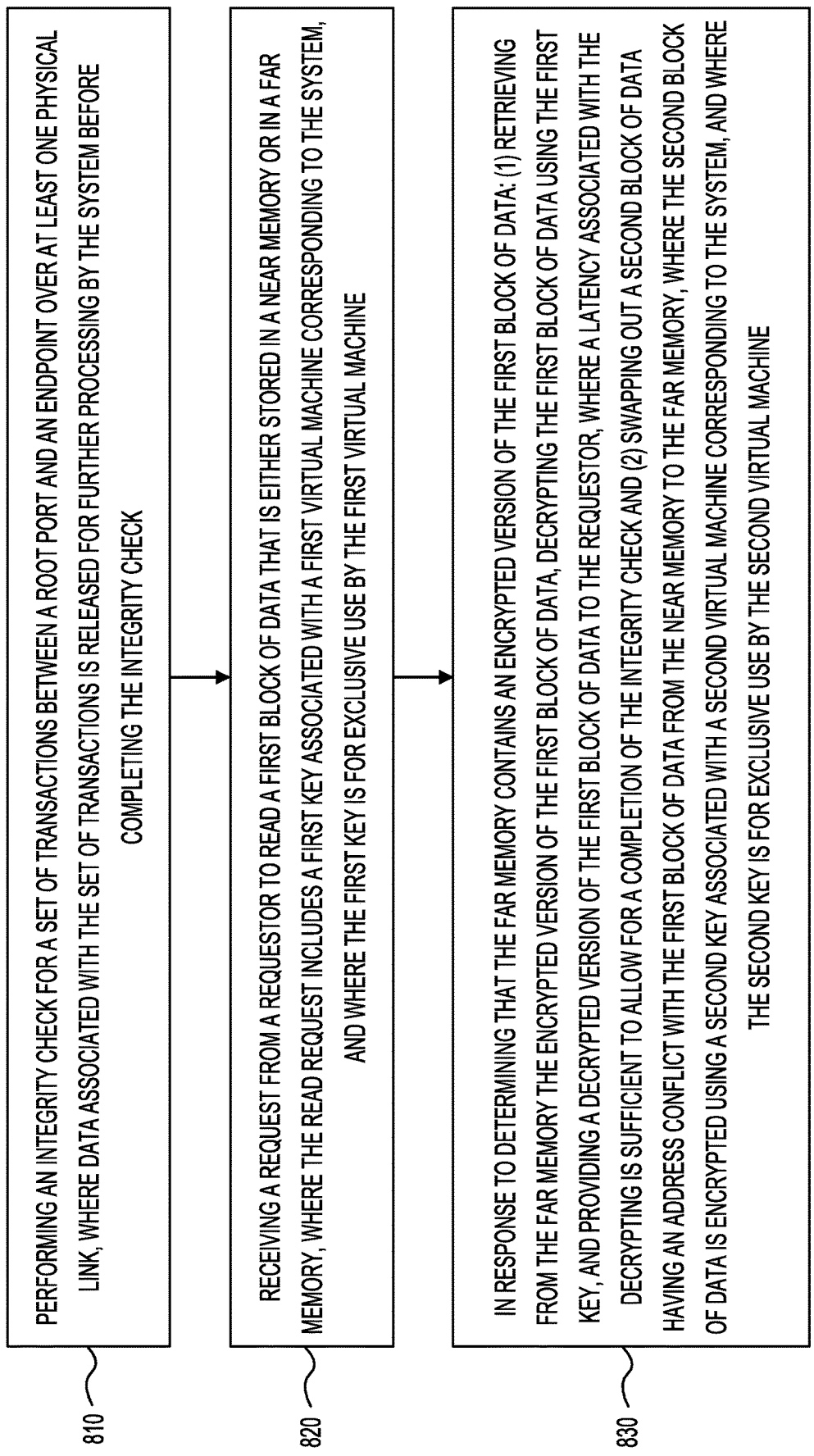
FIG. 8 shows a flow chart of another example method for managing a memory having a near memory and a far memory.

FIG. 8 shows a flow chart 800 of an example method for managing a memory having a near memory and a far memory, where the far memory is associated with a far memory system having a root port and an endpoint separated by at least one physical link. In one example, steps associated with this method may be executed by various components of the systems described earlier (e.g., system 100 of FIG. 1 and system 200 of FIG. 2). Step 810 may include performing an integrity check for a set of transactions between the root port and the endpoint over the at least one physical link, where data associated with the set of transactions is released for further processing by the system before completing the integrity check. As an example, as explained earlier with reference to FIG. 3A, the CXL root port generates a message authentication code (MAC) to ensure the integrity of the data across the physical link. Data across the physical links may be transported in flits (e.g., 512 bits) including the MAC header. In one example, multiple flits may be processed at the same time to generate the MAC for the multiple flits, so that the MAC is not generated for each flit. As an example, four flits may be processed to generate the MAC. The MAC may be generated using cryptographic hash functions (e.g., HMAC) or using block cipher algorithms. The CXL endpoint that is the counterpart to these transactions may perform the integrity check by comparing a locally generated MAC against the received MAC. A match may indicate an integrity check pass condition, whereas a lack of match between the locally generated MAC and the received MAC may indicate an integrity check failure condition. As explained earlier, the integrity check may be performed in the containment mode or the skid mode.

Step 820 may include receiving a request from a requestor to read a first block of data that is either stored in the near memory or in the far memory, where the read request includes a first key associated with a first virtual machine corresponding to the system, and where the first key is for exclusive use by the first virtual machine. As an example, the read request may be similar to the Rd A request described earlier with respect to transaction flow 300 of FIG. 3A. As explained earlier, during a read operation, a CPU (e.g., any of CPUs 112, 142, or 172 of FIG. 1) can issue a command that is processed by a home agent associated with an internal memory controller (e.g., any of internal memory controllers 118, 148, and 178 of FIG. 1) to read data. In this example, as shown in FIG. 3A, there is a read request from the home agent to read a block of data (e.g., cache line CL $A). The read request not only includes the address for the cache line, but also the key associated with the VM making the request.

Step 830 may include in response to determining that the far memory contains an encrypted version of the first block of data: (1) retrieving from the far memory the encrypted version of the first block of data, decrypting the first block of data using the first key, and providing a decrypted version of the first block of data to the requestor, where a latency associated with the decrypting is sufficient to allow for a completion of the integrity check and (2) swapping out a second block of data having an address conflict with the first block of data from the near memory to the far memory, where the second block of data is encrypted using a second key associated with a second virtual machine corresponding to the system, and where the second key is for exclusive use by the second virtual machine. The memory controller (e.g., any of the near memory controllers described earlier with respect to FIG. 1) may analyze the metadata portion associated with the block of data to determine that the far memory contains the encrypted version of the block of data. As described with respect to transaction flow 300 of FIG. 3A, data may be swapped out of the near memory to the far memory when there is a miss on a read request. In addition, as explained earlier, the near memory controller may decrypt the data using the key specific to the virtual machine on whose behalf the read operation was initiated. Advantageously, the use of per-VM key (the first key for the first VM and the second key for the second VM) may allow for confidential compute and isolation among virtual machines. Although FIG. 8 shows the steps associated with this method in flow chart 800 as being performed in a certain order, these steps need not be performed in the order shown. As an example, the steps associated with the integrity check can be performed in a manner such that data corresponding to multiple transactions associated with different read or write operations can be processed together.

In conclusion, the present disclosure relates to a method for managing a system having a near memory and a far memory. The method may include receiving a request from a requestor to read a first block of data that is either stored in the near memory or in the far memory, where the read request includes a first key associated with a first virtual machine corresponding to the system, where the first key is for exclusive use by the first virtual machine. The method may further include in response to determining that the far memory contains an encrypted version of the first block of data: (1) retrieving from the far memory the encrypted version of the first block of data, decrypting the first block of data using the first key, and providing a decrypted version of the first block of data to the requestor, and (2) swapping out a second block of data having an address conflict with the first block of data from the near memory to the far memory, where the second block of data is encrypted using a second key associated with a second virtual machine corresponding to the system, and where the second key is for exclusive use by the second virtual machine.

As part of the method, the step of determining that the far memory contains an encrypted version of the first block of data may comprise analyzing a metadata portion associated with the first block of data, the metadata portion having information related to whether the near memory contains the first block of data or whether the far memory contains the first block of data. The far memory may be associated with a far memory system having a root port and an endpoint separated by at least one physical link, and a transaction over the at least one physical link corresponding to the read request may be encrypted resulting in a double encryption of the first block of data during transit over the at least one physical link.

The far memory may be associated with a far memory system having a root port and an endpoint separated by at least one physical link, and the method may further comprise performing an integrity check for a set of transactions between the root port and the endpoint over the at least one physical link.

The method may further comprise analyzing a metadata portion associated with the first block of data, the metadata portion having: (1) first information related to whether the near memory contains the first block of data or whether the far memory contains the first block of data, (2) second information comprising a first trusted domain identifier value associated with the second block of data stored in the near memory, and (3) third information comprising a second trusted domain identifier value associated with the first block of data stored in the far memory, and where each of the first trusted domain identifier value and the second trusted domain identifier value is managed by a near memory controller associated with the near memory and neither the first trusted domain identifier value nor the second trusted domain identifier value is transmitted to the far memory.

The method may further comprise analyzing a metadata portion associated with the first block of data, the metadata portion having: (1) first information related to whether the near memory contains the first block of data or whether the far memory contains the first block of data and (2) second information comprising a same trusted domain identifier value associated with the second block of data regardless of whether the second block of data is stored in the near memory or the far memory. Each of the first block of data and the second block of data may comprise a cache line for a central processing unit (CPU) associated with the system.

In another aspect, the present disclosure relates to a system having a near memory and a far memory. The system may include a near memory controller configured to receive a request from a requestor to read a first block of data that is either stored in the near memory or in the far memory, where the read request includes a first key associated with a first virtual machine corresponding to the system, where the first key is for exclusive use by the first virtual machine. The near memory controller may further be configured to in response to determining that the far memory contains an encrypted version of the first block of data: (1) retrieve from the far memory the encrypted version of the first block of data, decrypting the first block of data using the first key, and provide a decrypted version of the first block of data to the requestor, and (2) swap out a second block of data having an address conflict with the first block of data from the near memory to the far memory, where the second block of data is encrypted using a second key associated with a second virtual machine corresponding to the system, and where the second key is for exclusive use by the second virtual machine.

The near memory controller may further be configured to analyze a metadata portion associated with the first block of data, the metadata portion having information related to whether the near memory contains the first block of data or whether the far memory contains the first block of data. The far memory may be associated with a far memory system having a root port and an endpoint separated by at least one physical link, and where a transaction over the at least one physical link corresponding to the read request may be encrypted by the far memory system, resulting in a double encryption of the first block of data during transit over the at least one physical link.

The far memory may be associated with a far memory system having a root port and an endpoint separated by at least one physical link, and where, using a message authentication code, an integrity check may be performed for any transactions over the at least one physical link. The near memory controller may further be configured to analyze a metadata portion associated with the first block of data, the metadata portion having: (1) first information related to whether the near memory contains the first block of data or whether the far memory contains the first block of data, (2) second information comprising a first trusted domain identifier value associated with the second block of data stored in the near memory, and (3) third information comprising a second trusted domain identifier value associated with the first block of data stored in the far memory, and wherein each of the first trusted domain identifier value and the second trusted domain identifier value is managed by the near memory controller and neither the first trusted domain identifier value nor the second trusted domain identifier value is transmitted to the far memory.

The near memory controller may further be configured to analyze a metadata portion associated with the first block of data, the metadata portion having: (1) first information related to whether the near memory contains the first block of data or whether the far memory contains the first block of data and (2) second information comprising a same trusted domain identifier value associated with the second block of data regardless of whether the second block of data is stored in the near memory or the far memory. The system may further comprise a central processing unit (CPU), and where each of the first block of data and the second block of data may comprise a cache line for the CPU.

In a yet another aspect, the present disclosure relates to a method for managing a system having a near memory and a far memory, where the far memory is associated with a far memory system having a root port and an endpoint separated by at least one physical link. The method may include performing an integrity check for a set of transactions between the root port and the endpoint over the at least one physical link, where data associated with the set of transactions is released for further processing by the system before completing the integrity check. The method may further include receiving a request from a requestor to read a first block of data that is either stored in the near memory or in the far memory, where the read request includes a first key associated with a first virtual machine corresponding to the system, and where the first key is for exclusive use by the first virtual machine.

The method may further include in response to determining that the far memory contains an encrypted version of the first block of data: (1) retrieving from the far memory the encrypted version of the first block of data, decrypting the first block of data using the first key, and providing a decrypted version of the first block of data to the requestor, where a latency associated with the decrypting is sufficient to allow for a completion of the integrity check and (2) swapping out a second block of data having an address conflict with the first block of data from the near memory to the far memory, where the second block of data is encrypted using a second key associated with a second virtual machine corresponding to the system, and where the second key is for exclusive use by the second virtual machine.

As part of the method, the step of determining that the far memory contains an encrypted version of the first block of data may comprise analyzing a metadata portion associated with the first block of data, the metadata portion having information related to whether the near memory contains the first block of data or whether the far memory contains the first block of data. The far memory may be associated with a far memory system having a root port and an endpoint separated by at least one physical link, and a transaction over the at least one physical link corresponding to the read request may be encrypted resulting in a double encryption of the first block of data during transit over the at least one physical link.

The method may further comprise analyzing a metadata portion associated with the first block of data, the metadata portion having: (1) first information related to whether the near memory contains the first block of data or whether the far memory contains the first block of data, (2) second information comprising a first trusted domain identifier value associated with the second block of data stored in the near memory, and (3) third information comprising a second trusted domain identifier value associated with the first block of data stored in the far memory, and where each of the first trusted domain identifier value and the second trusted domain identifier value is managed by a near memory controller associated with the near memory and neither the first trusted domain identifier value nor the second trusted domain identifier value is transmitted to the far memory.

The method may further comprise analyzing a metadata portion associated with the first block of data, the metadata portion having: (1) first information related to whether the near memory contains the first block of data or whether the far memory contains the first block of data and (2) second information comprising a same trusted domain identifier value associated with the second block of data regardless of whether the second block of data is stored in the near memory or the far memory. Each of the first block of data and the second block of data may comprise a cache line for a central processing unit (CPU) associated with the system.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for managing a system having a near memory and a far memory, the method comprising:
   receiving a read request from a requestor to read a first block of data that is either stored in the near memory or in the far memory, wherein the read request includes a first key associated with a first virtual machine corresponding to the system, wherein the first key is for exclusive use by the first virtual machine;
   in response to determining that the far memory contains an encrypted version of the first block of data: (1) retrieving from the far memory the encrypted version of the first block of data, decrypting the first block of data using the first key, and providing a decrypted version of the first block of data to the requestor, and (2) swapping out a second block of data having an address conflict with the first block of data from the near memory to the far memory, wherein the second block of data is encrypted using a second key associated with a second virtual machine corresponding to the system, and wherein the second key is for exclusive use by the second virtual machine; and
   analyzing a metadata portion associated with the first block of data, the metadata portion including: (1) first information related to whether the near memory contains the first block of data or whether the far memory contains the first block of data, (2) second information comprising a first trusted domain identifier value associated with the second block of data stored in the near memory, and (3) third information comprising a second trusted domain identifier value associated with the first block of data stored in the far memory, wherein each of the first trusted domain identifier value and the second trusted domain identifier value is managed by a near memory controller associated with the near memory regardless of whether the first block of data is stored in the near memory or the far memory.

2. The method of claim 1, wherein determining that the far memory contains an encrypted version of the first block of data comprises analyzing the first information included in the metadata portion associated with the first block of data.

3. The method of claim 1, wherein the far memory is associated with a far memory system having a root port and an endpoint separated by at least one physical link, and wherein a transaction over the at least one physical link corresponding to the read request is encrypted resulting in a double encryption of the first block of data during transit over the at least one physical link.

4. The method of claim 1, wherein the far memory is associated with a far memory system having a root port and an endpoint separated by at least one physical link, and wherein the method further comprises performing an integrity check for a set of transactions between the root port and the endpoint over the at least one physical link.

5. The method of claim 1, wherein neither the first trusted domain identifier value nor the second trusted domain identifier value is transmitted to the far memory.

6. The method of claim 1, wherein the second information comprises a same trusted domain identifier value associated with the second block of data regardless of whether the second block of data is stored in the near memory or the far memory.

7. The method of claim 1, wherein each of the first block of data and the second block of data comprises a cache line for a central processing unit (CPU) associated with the system.

8. A system having a near memory and a far memory, the system comprising:
   a near memory controller configured to receive a read request from a requestor to read a first block of data that is either stored in the near memory or in the far memory, wherein the read request includes a first key associated with a first virtual machine corresponding to the system, wherein the first key is for exclusive use by the first virtual machine;
   the near memory controller further configured to in response to determining that the far memory contains an encrypted version of the first block of data: (1) retrieve from the far memory the encrypted version of the first block of data, decrypting the first block of data using the first key, and provide a decrypted version of the first block of data to the requestor, and (2) swap out a second block of data having an address conflict with the first block of data from the near memory to the far memory, wherein the second block of data is encrypted using a second key associated with a second virtual machine corresponding to the system, and wherein the second key is for exclusive use by the second virtual machine; and
   wherein the near memory controller is further configured to analyze a metadata portion associated with the first block of data, the metadata portion having: (1) first information related to whether the near memory contains the first block of data or whether the far memory contains the first block of data, (2) second information comprising a first trusted domain identifier value associated with the second block of data stored in the near memory and (3) third information comprising a second trusted domain identifier value associated with the first block of data stored in the far memory, and wherein each of the first trusted domain identifier value and the second trusted domain identifier value is managed by the near memory controller regardless of whether the first block of data is stored in the near memory or the far memory.

9. The system of claim 8, wherein as part of determining that the far memory contains an encrypted version of the first block of data, the near memory controller is further configured to analyze the first information included in the metadata portion associated with the first block of data.

10. The system of claim 8, wherein the far memory is associated with a far memory system having a root port and an endpoint separated by at least one physical link, and wherein a transaction over the at least one physical link corresponding to the read request is encrypted by the far memory system, resulting in a double encryption of the first block of data during transit over the at least one physical link.

11. The system of claim 8, wherein the far memory is associated with a far memory system having a root port and an endpoint separated by at least one physical link, and wherein, using a message authentication code, an integrity check is performed for any transactions over the at least one physical link.

12. The system of claim 8, wherein neither the first trusted domain identifier value nor the second trusted domain identifier value is transmitted to the far memory.

13. The system of claim 8, wherein the second information comprises a same trusted domain identifier value associated with the second block of data regardless of whether the second block of data is stored in the near memory or the far memory.

14. The system of claim 8, wherein the system further comprises a central processing unit (CPU), and wherein each of the first block of data and the second block of data comprises a cache line for the CPU.

15. A method for managing a system having a near memory and a far memory, wherein the far memory is associated with a far memory system having a root port and an endpoint separated by at least one physical link, the method comprising:
   performing an integrity check for a set of transactions between the root port and the endpoint over the at least one physical link;
   receiving a read request from a requestor to read a first block of data that is either stored in the near memory or in the far memory, wherein the read request includes a first key associated with a first virtual machine corresponding to the system, and wherein the first key is for exclusive use by the first virtual machine; and
   in response to determining that the far memory contains an encrypted version of the first block of data: (1) retrieving from the far memory the encrypted version of the first block of data, decrypting the first block of data using the first key, and providing a decrypted version of the first block of data to the requestor, wherein a latency associated with the decrypting is sufficient to allow for a completion of the integrity check and (2) swapping out a second block of data having an address conflict with the first block of data from the near memory to the far memory, wherein the second block of data is encrypted using a second key associated with a second virtual machine corresponding to the system, and wherein the second key is for exclusive use by the second virtual machine; and
   analyzing a metadata portion associated with the first block of data, the metadata portion having: (1) first information related to whether the near memory contains the first block of data or whether the far memory contains the first block of data, (2) second information comprising a first trusted domain identifier value associated with the second block of data stored in the near memory, and (3) third information comprising a second trusted domain identifier value associated with the first block of data stored in the far memory, and wherein each of the first trusted domain identifier value and the second trusted domain identifier value is managed by a near memory controller associated with the near memory regardless of whether the first block of data is stored in the near memory or the far memory.

16. The method of claim 15, wherein determining that the far memory contains an encrypted version of the first block of data comprises analyzing the first information included in the metadata portion associated with the first block of data.

17. The method of claim 15, wherein the far memory is associated with a far memory system having a root port and an endpoint separated by at least one physical link, and wherein a transaction over the at least one physical link corresponding to the read request is encrypted by the far memory system, resulting in a double encryption of the first block of data during transit over the at least one physical link.

18. The method of claim 15, wherein neither the first trusted domain identifier value nor the second trusted domain identifier value is transmitted to the far memory.

19. The method of claim 15, wherein the second information comprises a same trusted domain identifier value associated with the second block of data regardless of whether the second block of data is stored in the near memory or the far memory.

20. The method of claim 15, wherein each of the first block of data and the second block of data comprises a cache line for a central processing unit (CPU) associated with the system.

* * * * *